United States Patent [19]

Kato

[11] Patent Number: 5,054,711
[45] Date of Patent: Oct. 8, 1991

[54] BELT DRIVEN TAPE RUNNING APPARATUS WITH AFTER SHOCK PROTECTION

[75] Inventor: Masao Kato, Kumagaya, Japan

[73] Assignee: Kabushiki Kaisha Toshiba, Kawasaki, Japan

[21] Appl. No.: 457,980

[22] Filed: Dec. 27, 1989

[30] Foreign Application Priority Data

Dec. 27, 1988 [JP] Japan .................................. 63-329759

[51] Int. Cl.$^5$ .................. G11B 15/00; F16H 55/18
[52] U.S. Cl. ................................. 242/201; 74/409; 360/96.3
[58] Field of Search ............... 292/200, 201, 204, 205; 360/96.3, 96.4; 74/409

[56] References Cited

U.S. PATENT DOCUMENTS

| | | | |
|---|---|---|---|
| 4,059,245 | 11/1977 | Hirose | 242/201 |
| 4,060,840 | 11/1977 | Umeda | 360/130 |
| 4,122,506 | 10/1978 | Kubo et al. | 360/130 |
| 4,133,497 | 1/1979 | Rothlisberger | 242/200 |
| 4,264,937 | 4/1981 | Kabacinski | 360/85 |
| 4,319,292 | 3/1982 | Katoh | 360/96.5 |
| 4,370,682 | 1/1983 | Katoh | 360/71 |
| 4,577,246 | 3/1986 | Matsuki | 360/96.5 |
| 4,628,383 | 12/1986 | Miyamoto | 360/85 |
| 4,642,714 | 2/1987 | Miyamoto | 360/96.5 |
| 4,723,177 | 2/1988 | Ahn | 360/96.5 |
| 4,739,670 | 4/1988 | Tomita et al. | 74/409 |
| 4,768,113 | 8/1988 | Sato | 360/96.5 |
| 4,809,100 | 2/1989 | Tanaka | 360/96.1 |
| 4,825,322 | 4/1989 | Kunze | 360/96.3 |
| 4,837,646 | 6/1989 | Nagai et al. | 360/85 |
| 4,851,938 | 7/1989 | Inami | 360/69 |
| 4,858,042 | 8/1989 | Ito | 360/96.5 |
| 4,866,549 | 9/1989 | Terayama | 360/85 |
| 4,872,076 | 10/1989 | Uehara | 360/99.07 |
| 4,918,549 | 4/1990 | Katono | 360/93 |
| 4,930,720 | 6/1990 | Hwang | 360/96.5 X |

Primary Examiner—Daniel P. Stodola
Assistant Examiner—William G. Battista, Jr.
Attorney, Agent, or Firm—Cushman, Darby & Cushman

[57] ABSTRACT

A pair of reel bases mounts a tape cassette in which a tape to be run is wound. A rotating member is rotatable provided between the pair of reel bases. A belt driving mechanism has a belt for transmitting a rotational force from a driving source to the rotating member. A tape running unit has first and second rotation transmission members provided to be rotatable coaxially with the rotating member and to be brought into contact with/separated from one of the pair of reel bases in correspondence with a rotational direction of the rotating member. The first and second rotation transmission members are engaged with each other with a predetermined gap in a circumferential direction therebetween to transmit a rotational force. The predetermined gap is set to have a sufficient size for absorbing backward rotation of the rotating member caused by an after shock of the belt produced upon stop of the tape, thereby preventing backward rotation of the reel bases.

3 Claims, 7 Drawing Sheets

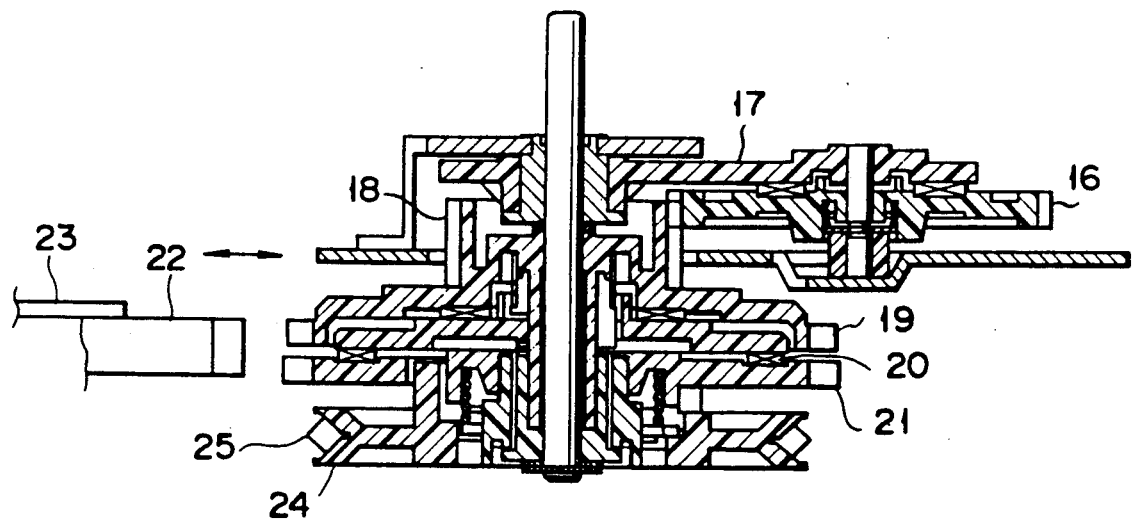
F I G. 2

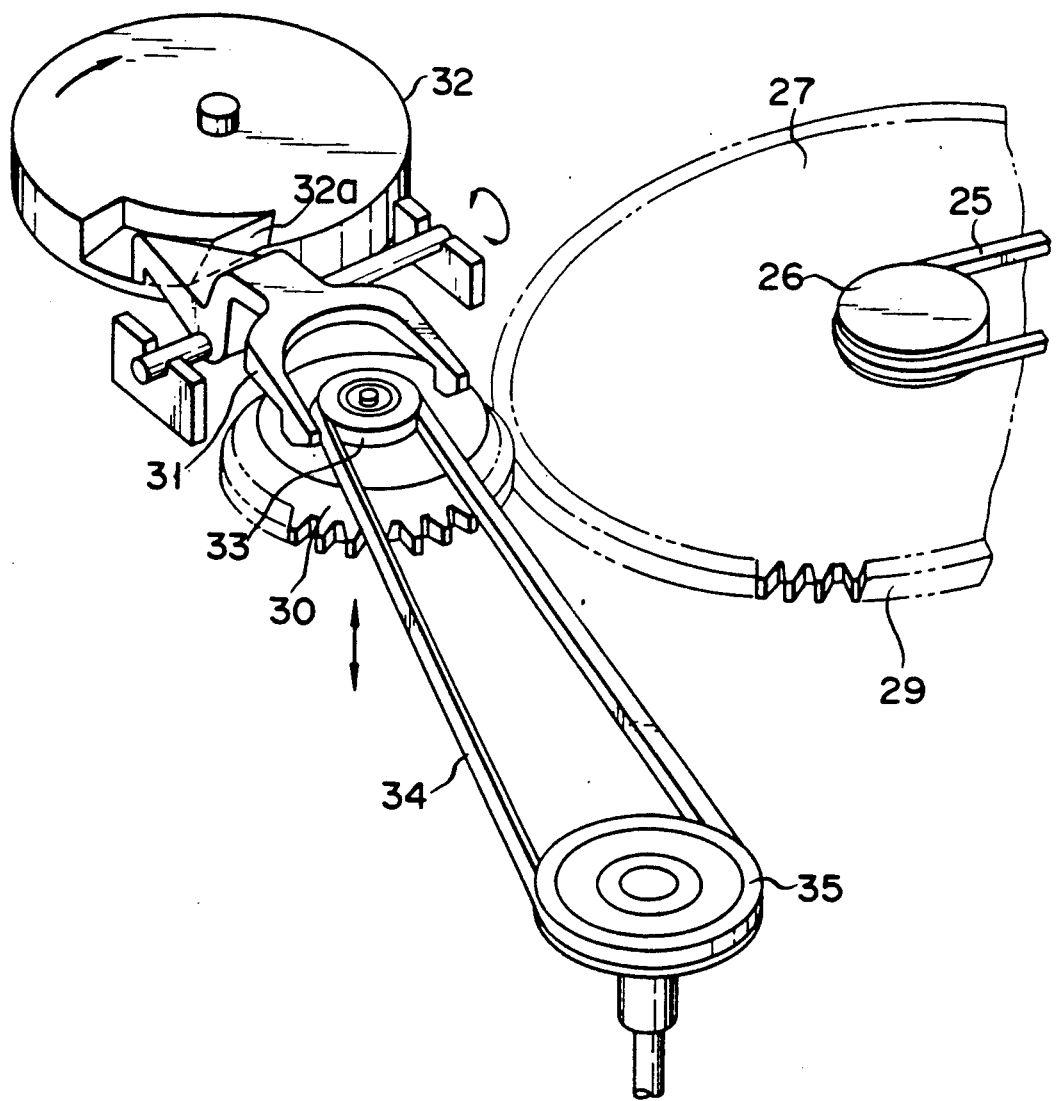
F I G. 4

BELT DRIVEN TAPE RUNNING APPARATUS WITH AFTER SHOCK PROTECTION

BACKGROUND OF THE INVENTION

1. Field of the Invention

The present invention generally relates to a magnetic recording/reproducing apparatus and, more particularly, to a belt driven tape running apparatus which can be applied to a magnetic recording/reproducing apparatus such as a video tape recorder (hereafter a VTR).

2. Description of the Related Art

Generally, when a user inserts a tape cassette substantially horizontally into a cassette holder at a front portion of a VTR, a front loading unit of the VTR is activated to convey the cassette holder substantially horizontally to a tape driving unit, and the tape cassette is loaded in the tape driving unit. Thereafter, a tape loading mechanism is activated to extract a tape wound in the tape cassette and wind the tape around a cylinder. An operation mode of the tape driving unit is switched to a predetermined mode to run the tape.

A demand has arisen for such a VTR to achieve higher precision of operation control for each unit while maintaining a simple arrangement, thereby improving reliability.

The above demand is directed to a tape running system for performing tape running after extracting a tape of a loaded tape cassette and winding the tap around a cylinder. That is, in the tape running system, a tape cassette is mounted on a pair of reel bases, a driving force is transmitted from a driving source to one of the reel bases via a belt transmission mechanism, and the tape is driven by a capstan and a pinch roller, thereby running the tape in correspondence with various operation modes such as tape reproduction and tape recording. Therefore, in such a tape running system, highly precise operation control is required to realize correct tape running.

In the above belt transmission mechanism, however, tensions of a driving belt differ between its forward and backward sides in a driving state. Therefore, if driving/stopping is repeated as in an intermittent slow reproduction mode, the tension at the backward side is given to the reel bases to cause a so-called "after shock" phenomenon. As a result, the reel bases are rotated in an opposite direction to vary the running position of the tape.

Therefore, in a conventional VTR, drive control of a driving motor for driving a belt transmission mechanism is electrically adjusted to correct a tape feed amount caused by the after shock phenomenon, thereby correctly running a tape.

In the arrangement in which the tape feed amount caused by the after shock phenomenon is electrically corrected, a tape feed interval is limited. Therefore, if more precise intermittent feeding is required, it becomes difficult to perform proper correction.

As described above, in the conventional magnetic recording/reproducing apparatus such as a VTR, a correctable tape feed amount caused by the after shock phenomenon is limited, and it is difficult to perform precise tape feeding. As a result, the correctable tape feed amount caused by the after shock phenomenon is limited.

SUMMARY OF THE INVENTION

It is, therefore, an object of the present invention to provide a new and improved belt driven tape running apparatus with an after shock protection which can realize a highly precise tape feeding operation by a simple arrangement without limiting a correctable tape feed amount caused by the after shock phenomenon.

According to the present invention, there is provided a belt driven tape running apparatus comprising:

a pair of reel bases for mounting a tape cassette in which a tape to be run is wound;

a rotating member provided between the pair of reel bases;

a belt driving mechanism having a belt for transmitting a rotational force from a driving source to the rotating member; and a rotation transmission mechanism having first and second rotation transmission members, said transmission member provided coaxially with the rotating member and brought into contact with or separated from one of the reel bases in correspondence with a rotational direction of the rotating member, the first and second rotation transmission members being engaged with each other with a predetermined gap in a circumferential direction therebetween to transmit a rotational force, the predetermined gap being set to have a sufficient size for absorbing backward rotation caused in the reel bases by an after shock of the belt upon stop of the tape to prevent backward rotation of the reel bases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention, in which:

FIG. 2 is a detailed sectional view showing a clutch gear mechanism shown in FIG. 1B;

FIG. 4 is a detailed perspective view showing a mode switching mechanism and a belt transmission mechanism shown in FIG. 1B.

DETAILED DESCRIPTION OF THE PREFERRED EMBODIMENTS

An embodiment of the present invention will be described in detail below with reference to the accompanying drawings.

Figure 1A:
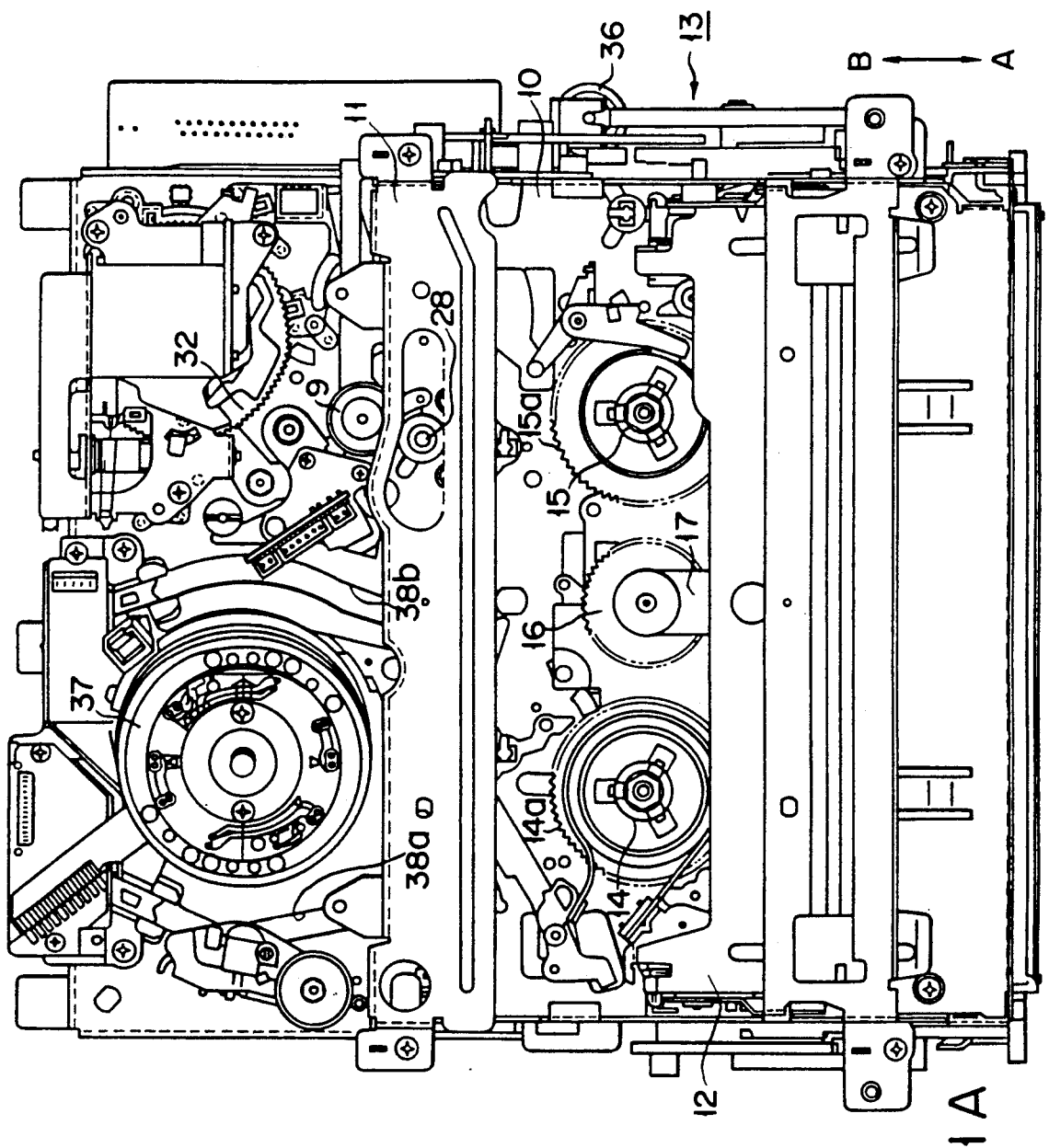
FIGS. 1A to 1C are top, bottom, and side views, respectively, showing a VTR to which an embodiment of a cassette loading apparatus according to the present invention is applied.
Figure 1B:
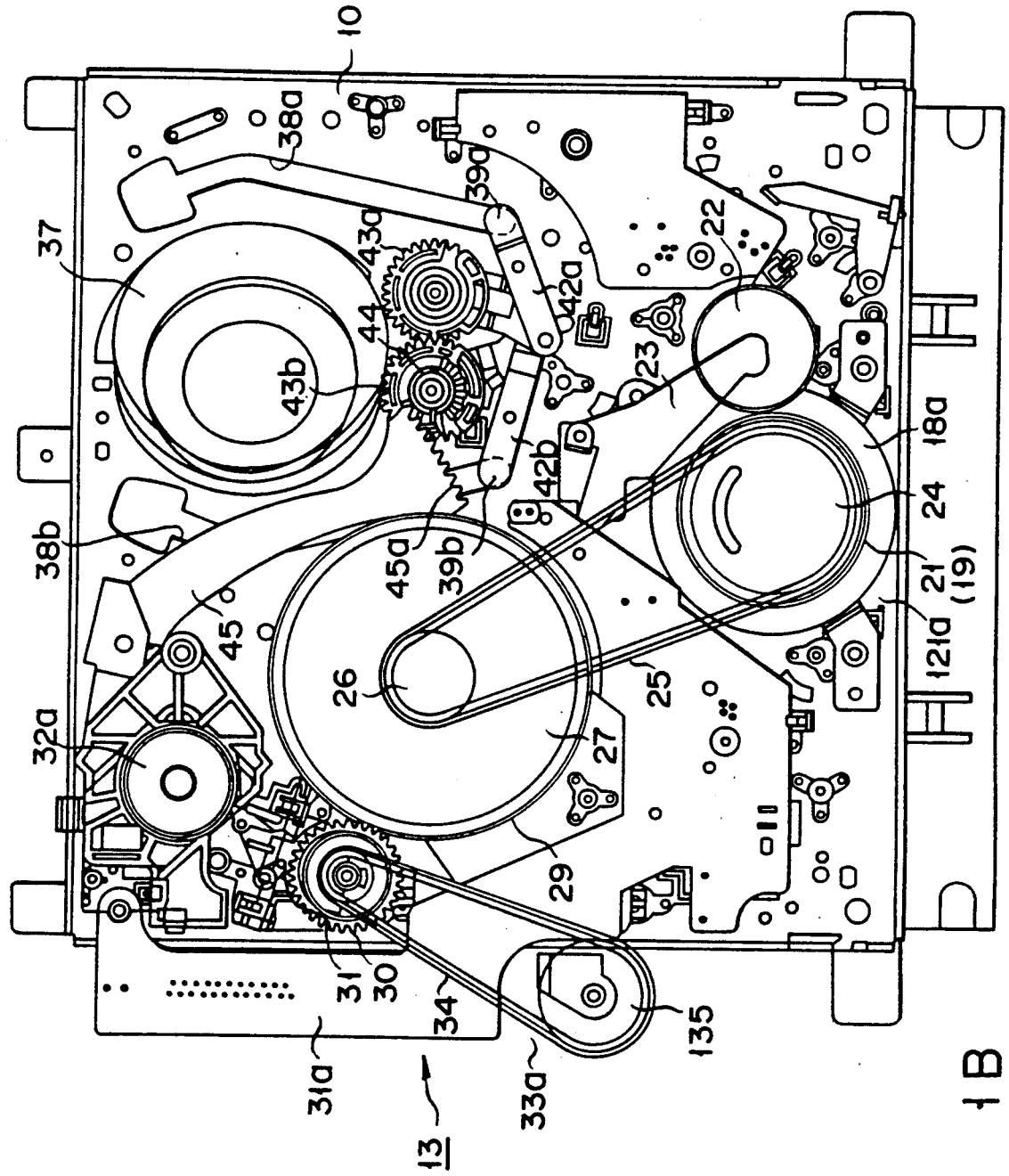
Figure 1C:
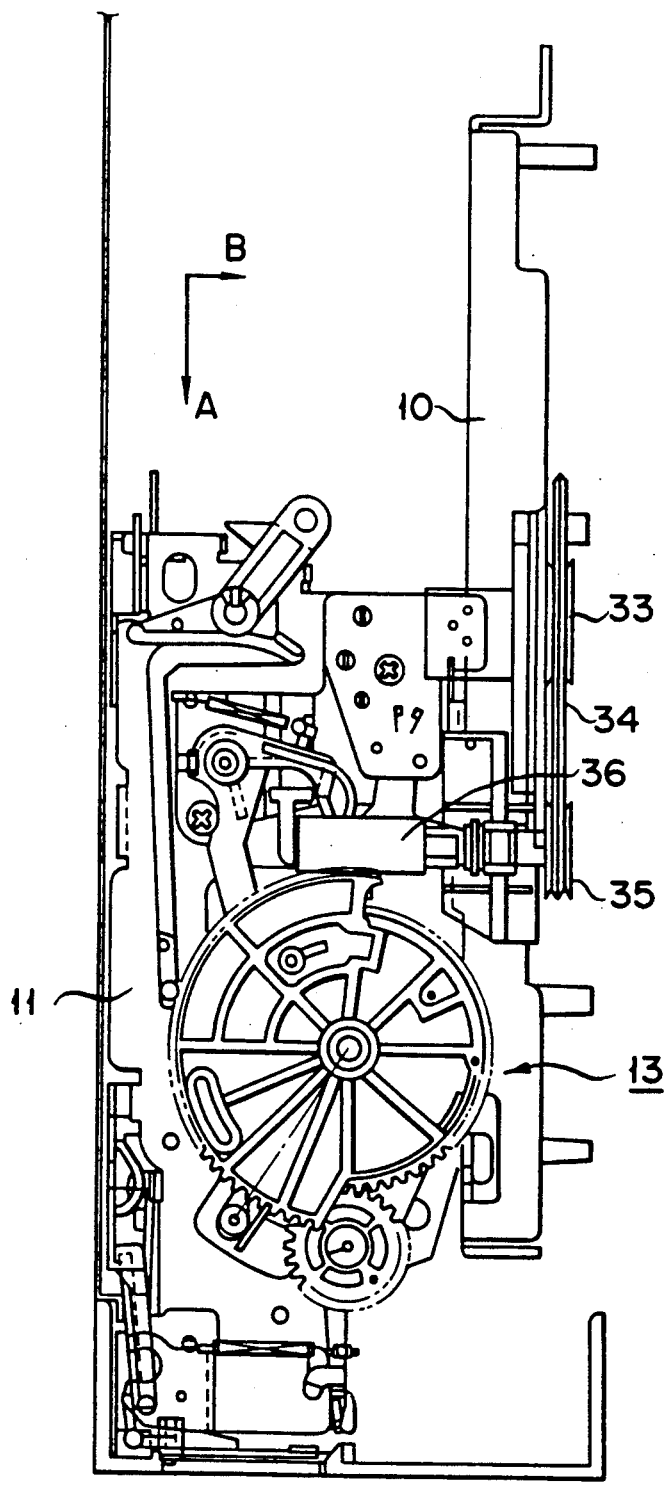

FIGS. 1A, 1B, and 1C show a VTR to which the present invention is applied. FIGS. 1A, 1B, and 1C are top, bottom, and side views of the VTR, respectively. That is, reference numeral 10 denotes a main chassis and a frame member 11 is provided at one end thereof. A cassette holder 12 is held by the frame member 11 so as to be movable along directions indicated by arrows A and B. A tape cassette C (not shown in FIGS. 1A, 1B, and 1C for illustrative convenience) is inserted in the cassette holder 12 at a cassette insertion position at the end of the arrow A direction, and a loading drive mechanism 13 of a front loading unit is driven accordingly to convey the cassette C (not shown in FIGS. 1A, 1B, and 1C for illustrative convenience) in the arrow B direction and loads the cassette C on reel bases 14 and 15 at tape supply and take-up sides, respectively of a tape driving unit.

Figure 3:
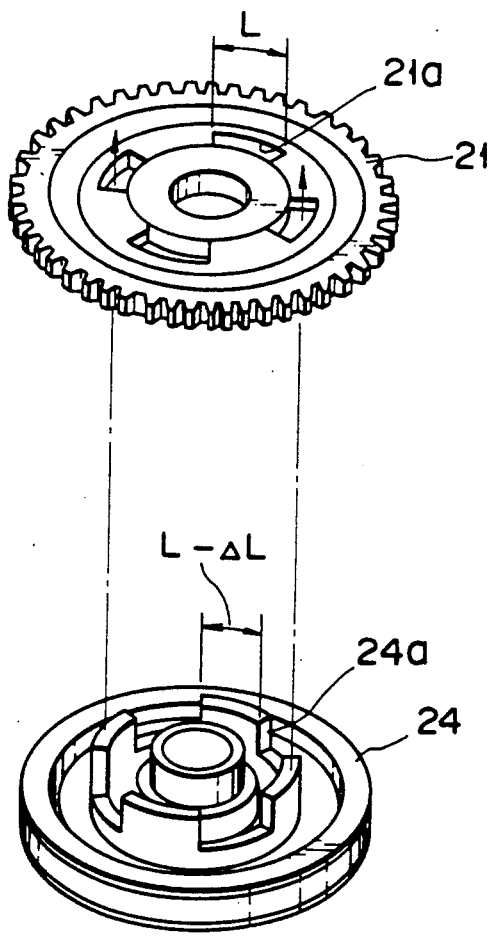
FIG. 3 is an exploded perspective view showing an engagement between first and second rotation transmission members shown in FIG. 2.

Gears 14a and 15a are provided for the reel bases 14 and 15, respectively, and a driving gear 16 constituting a tape running mechanism is disposed halfway between the gears 14a and 15a. The gear 16 is supported at one end of a rocking member 17. A gear 18 is mounted on the other end of the rocking member 17, as shown in FIG. 2, and meshed with the driving gear 16. The gear 18 is provided coaxially with a first gear 19 of a clutch gear mechanism 18a. The gear 19 is disposed to overlap a second gear 21 via a friction member 20. A clutch switching gear 22 is arranged to oppose the first and second gears 19 and 21 so as to be brought into contact with/separated from the gears 19 and 21. The gear 22 is rotatably disposed via a switching ever 23 interlocked with an operation mode switching mechanism and is selectively meshed with the first or second gear 19 or 21, in response to the operation mode. A pulley 24 for constituting a tape driving belt transmission mechanism 121a is disposed coaxially with the second gear 21. As shown in FIG. 3, a plurality of engaging holes 21a each having a width L are formed at predetermined intervals along the circumference of the second gear 21, and a plurality of engaging portions 24a each having a width L - ΔL are formed at predetermined intervals along the circumference of the pulley 24. The engaging holes 21a and the portions 24a are engaged with a gap ΔL therebetween to transmit a rotational force. One end of a driving belt 25 is wound around the pulley 24, and its other end is wound around a driving pulley 26 (see FIG. 1B). The driving pulley 26 is fitted on a rotating shaft of a rotatable capstan motor 27. A capstan 28 is provided coaxially with the capstan motor 27. The driving force of the capstan 28 is transmitted to the pulley 24 via the driving belt 25. The pulley 24 is rotated to bring each of its engaging portions 24a into contact with one end of a corresponding engaging hole 21a of the second gear 21 and is engaged with the gear 21 so as to transmit the rotational force, thereby rotating one of the gears 14a and 15a of the reel bases 14 and 15, respectively, via the gear 22, the first gear 19, the gear 18, the rocking member 17, and the driving gear 16. The tape is run while being sandwiched between the capstan 28 and the pinch roller 9.

When driving of the motor 27 is stopped to stop tape running, a so-called "after shock" phenomenon is caused by a difference in tensions produced between driving and returning sides of the driving belt 25 upon driving, and a loading force in a direction opposite to a tape feed direction is given by the after shock phenomenon to the pulley 24 via the belt 25. As a result, the pulley 24 is rotated backward, and each of its engaging portions 24a is brought into contact with the other end of a corresponding engaging hole 21a of the gear 21, thereby absorbing the loading force caused by the after shock phenomenon. Since the loading force is prevented from being transmitted to the second gear 21, the gear 22, the first gear 19, the gear 18, and rocking member 17, and the driving gear 16, the reel bases 14 and 15 maintain tape feed positions corresponding to the stop of the motor 27 and stop tape running.

A driving gear 29 is fitted on the circumference of a rotating member of the motor 27, and an elevating gear 30 is arranged to oppose the driving gear 29. The elevating gear 30 is provided movably along an axial direction with respect to the main chassis 10 via a spring mechanism (not shown). One end of a pivotal switching lever 31 is engaged with the upper surface of the gear 30 (see FIG. 4). The other end of the level 31 is engaged with a first cam portion formed on one surface of a mode switching cam 32 of the operation mode switching mechanism so that its pivoting motion is controlled via the cam 32. That is, upon cassette loading, one end of the switching lever 31 is separated from the elevating gear 30 so that the gear 30 is moved upward via the spring mechanism (not shown) and meshed with the driving gear 29. Upon completion of cassette loading, the lever 31 is switched so that its one end moves the gear 30 downward in the axial direction against a biasing force of the spring mechanism (not shown) to separate the gear 30 from the driving gear 29. A pulley 33 is provided coaxially with the elevating gear 30. One end of a driving belt 34 constituting a belt transmission mechanism 33a for cassette loading is wound around the pulley 33. The other end of the belt 34 is wound around a pulley 135. The pulley 135 is provided coaxially with a worm gear 36 (see FIG. 1A) of the loading drive mechanism 13. In correspondence with an upward/downward movement of the elevating gear 30, a rotational force of the motor 27 is selectively transmitted to the pulley 33, the belt 34, the pulley 35 and the worm gear 36 to drive the loading drive mechanism 13, thereby causing the mechanism 13 to perform loading of the cassette holder 12.

Figure 5:
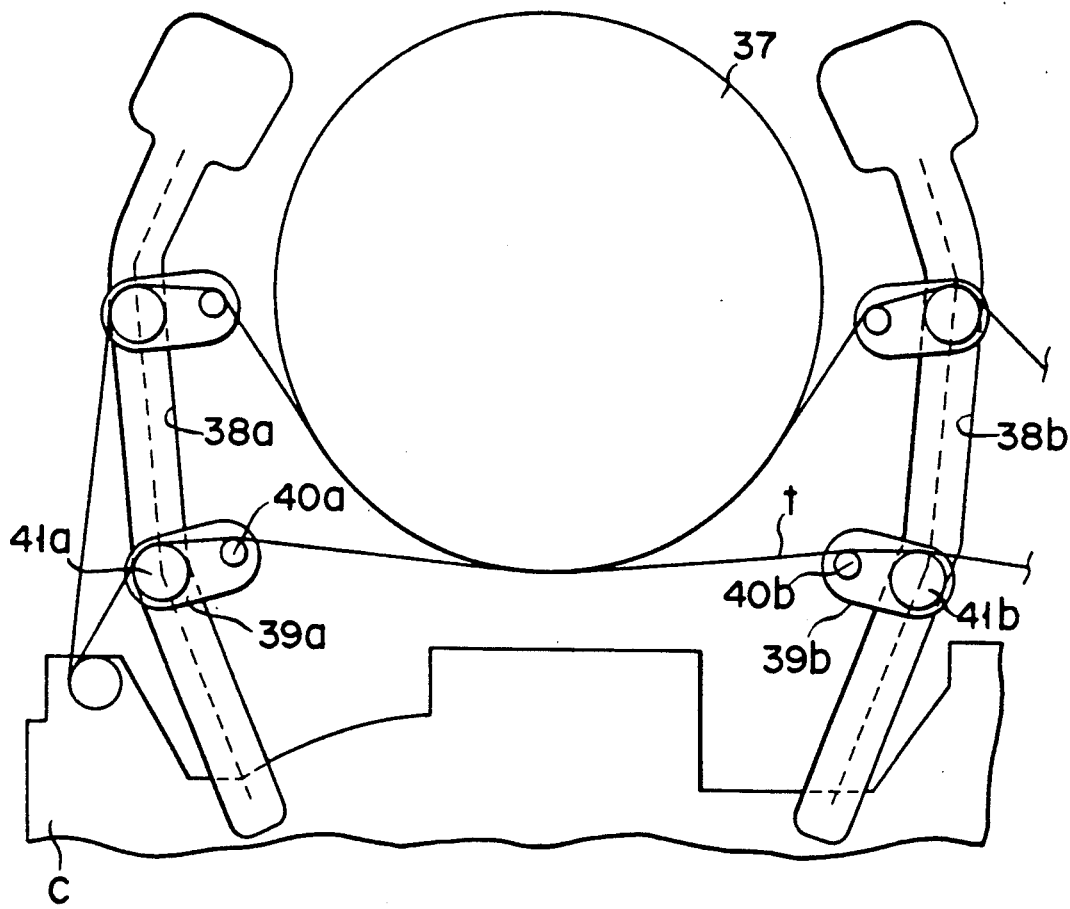
FIGS. 5 and 6 are detailed perspective views showing a tape loading state with respect to a cylinder shown in FIGS. 1A and 1B and its link mechanism.
Figure 6:
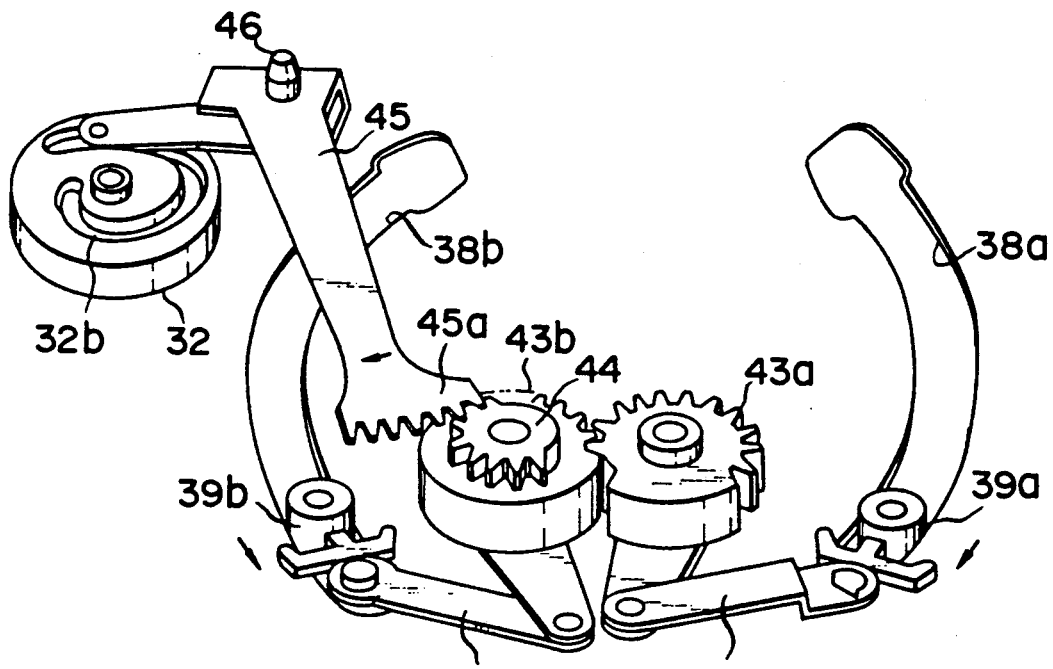

A helical scan type cylinder 37 having magnetic heads is rotatably arranged on the main chassis 10 in correspondence with the frame member 11. First and second tape loading guide holes 38a and 38b are adjacent to the circumference of the cylinder 37 in correspondence with tape entrance and exit sides. As shown in FIG. 5, first and second tape extracting members 39a and 39b are movably received in the first and second guide holes 38a and 38b, respectively. The members 39a and 39b include inclined posts 40a and 40b substantially parallel to the cylinder 37 and guide rollers 41a and 41b substantially perpendicular to the main chassis 10 and arranged next to the inclined posts 40a and 40b, respectively. One end of each of first and second link mechanisms 42a and 42b is connected to a corresponding one of the first and second tape extracting members 39a and 39b. The other end of each of the link mechanisms 42a and 42b is supported by a corresponding one of first and second driving gears 43a and 43b to be meshed with each other. A notched gear 44 is provided coaxially with the second driving gear 43b, and a sector gear 45a formed at one end portion of a driving lever 45 is meshed with the notched gear 44. A middle portion of the lever 45 is pivotally supported by the main chassis 10 via a rotating shaft 46, and its other end portion is engaged with a second cam surface 32b of the mode switching cam 32. With this arrangement, the driving lever 45 is driven in accordance with an operation of the mode switching cam 32 to drive the first and second tape extracting members 39a and 39b via the notched gear 44, the first and second driving gears 43a and 43b, and the first and second link mechanisms 42a and 42b, respectively, thereby causing the members 39a and 39b to perform tape loading.

In the VTR as described above, the engaging portions 24a are formed on the pulley 24 to which the driving force from the capstan motor 27 is transmitted via the driving belt 25. In addition, the engaging holes 21a to be engaged with the engaging portions 24a with the gap $\Delta L$ therebetween to transmit the rotational force are formed in the second gear 21 for rotating the reel bases 14 and 15. Therefore, when the driving force of the motor 27 is transmitted to the pulley 24 via the belt 25, each of the engaging portions 24a of the pulley 24 is engaged with one end of a corresponding engaging hole 21a of the second gear 21 to transmit the rotational force, thereby driving one of the reel bases 14 and 15. A tape is run while being sandwiched between the capstan 28 and the pinch roller 9. When driving from the motor 27 is stopped, a loading force caused by an after shock phenomenon in a direction opposite to the tape feed direction is given by the driving belt 25 to the pulley 24, thereby rotating the pulley 24 backward. As a result, each of the engaging portions 24a of the pulley 24 is brought into contact with the other end of a corresponding engaging hoe 21a to absorb the load caused by the after shock phenomenon, thereby stopping driving of the reel bases 14 and 15 and tape running. In this manner, upon stop of the driving source, a backward moving amount of the pulley 24 obtained by the loading force in the return direction caused by the after shock phenomenon of the driving belt 25 of the belt transmission mechanism is absorbed. Therefore, when transmission of the driving force from the motor 27 is stopped, the reel bases 14 and 15 realize highly precise tape feeding corresponding to the stop. As a result, fine tape feeding as in intermittent slow reproduction can be realized with high precision.

Note that in the above embodiment, the engaging portions 24a are formed on the pulley 24, and the engaging holes 21a are formed in the second gear 21, so that the pulley 24 and the second gear 21 are engaged with each other with the predetermined gap $\Delta L$ to transmit the rotational force. The present invention, however, is not limited to the above arrangement. For example, engaging holes may be formed in the pulley 24 while engaging portions are formed on the second gear 21.

In addition, in the above embodiment, the driving force from the capstan motor 27 as the driving source is transmitted via the belt transmission mechanism. The driving source, however, is not limited to that of the above embodiment, but an independent driving source may be used.

Furthermore, in the above embodiment, the present invention is applied to a VTR. The present invention, however, is not limited to the above embodiment but can be applied to another magnetic recording/reproducing apparatus such as a cassette tape recorder.

Therefore, the present invention is not limited to the above embodiment but can be variously modified and carried out without departing from the spirit and scope of the present invention.

As has been described above, according to the present invention, there is provided a belt driven tape running apparatus capable of realizing a highly precise tape feeding operation with a simple arrangement without limiting a tape feed amount.

What is claimed is:

1. A belt driven tape running apparatus comprising:
    a pair of reel bases for mounting a tape cassette in which a tape to be run is wound;
    a rotating member provided between said pair of reel bases;
    a belt driving mechanism including a belt for transmitting a rotational force from a driving source to said rotating member; and
    a rotation transmission mechanism, including first and second rotation transmission member, said rotation transmission members provided coaxially with said rotating member and contacting with one of said reel bases in correspondence with a rotational direction of said rotating member, said first rotation transmission mechanism engaging with said second rotation transmission member and having a predetermined gap in a circumferential direction therebetween for transmitting a rotational force, the predetermined gap having a size sufficient for absorbing a reverse rotation of said reel bases caused by an after shock of said belt after the stopping of said tape.

2. An apparatus according to claim 1, wherein said first rotation transmission member has gear teeth contacting with one of said reel bases, and a plurality of engaging holes thereon having a predetermined width and formed at a predetermined pitch in a circumferential direction of said gear.

3. An apparatus according to claim 2, wherein said second rotation transmission member includes a plurality of engaging portions each having a width smaller than the width of said plurality of engaging holes and forming at the predetermined in a circumferential direction thereof, said plurality of engaging portions being inserted in said plurality of engaging holes.

* * * * *